(12) United States Patent
Yang

(10) Patent No.: US 12,506,836 B1
(45) Date of Patent: Dec. 23, 2025

(54) METHOD AND SYSTEM FOR CONTROLLING ECHO CANCELLATION

(71) Applicant: Apple Inc., Cupertino, CA (US)

(72) Inventor: Qing Yang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 562 days.

(21) Appl. No.: 17/746,751

(22) Filed: May 17, 2022

(51) Int. Cl.
  *H04M 9/08* (2006.01)
  *H04R 3/00* (2006.01)

(52) U.S. Cl.
  CPC ............ *H04M 9/085* (2013.01); *H04R 3/005* (2013.01)

(58) Field of Classification Search
  CPC .............................. H04M 9/085; H04R 3/005
  See application file for complete search history.

(56) References Cited

U.S. PATENT DOCUMENTS

| | | | |
|---|---|---|---|
| 7,099,821 B2* | 8/2006 | Visser | H04R 3/005 704/226 |
| 7,174,022 B1* | 2/2007 | Zhang | H04R 3/005 704/226 |
| 8,954,324 B2* | 2/2015 | Wang | G10L 25/78 704/218 |
| 9,973,849 B1* | 5/2018 | Zhang | H04R 3/005 |
| 10,466,962 B2* | 11/2019 | Wilberding | G06F 3/04817 |
| 11,893,308 B2* | 2/2024 | Wilberding | G10L 15/08 |
| 11,924,367 B1* | 3/2024 | Valin | G10L 25/18 |
| 12,063,486 B2* | 8/2024 | Soto | H04R 3/005 |
| 12,080,313 B2* | 9/2024 | Luneau | H04R 3/005 |
| 12,205,608 B2* | 1/2025 | Appleton | G10L 21/0232 |
| 12,217,765 B2* | 2/2025 | Giacobello | G10L 21/02 |
| 2004/0013038 A1* | 1/2004 | Kajala | G01S 3/802 342/383 |
| 2010/0073455 A1* | 3/2010 | Iwabuchi | H04N 7/147 348/E7.078 |
| 2013/0304476 A1* | 11/2013 | Kim | G10L 21/00 704/270 |
| 2014/0153742 A1* | 6/2014 | Hershey | H04B 15/00 381/94.1 |
| 2014/0286497 A1* | 9/2014 | Thyssen | H04R 3/005 381/92 |
| 2024/0249742 A1* | 7/2024 | Cohen | G10L 25/84 |
| 2024/0259757 A1* | 8/2024 | Dublon | H04S 7/306 |

(Continued)

OTHER PUBLICATIONS

U.S. Appl. No. 17/322,539, filed May 17, 2021 with the USPTO.

*Primary Examiner* — Lisa Hashem
(74) *Attorney, Agent, or Firm* — Aikin & Gallant, LLP

(57) ABSTRACT

A method performed by a media source device that has several microphones, the method includes receiving an input audio signal, providing the input audio signal to a media playback device that is communicatively coupled to a speaker, receiving, from the microphones, microphone signals that include the ambient sounds within an ambient environment in which the media source device is located and at least one sound of the input audio signal produced by the speaker, producing, using a machine learning (ML) model that has input based on the microphone signals and the input audio signal, an echo reference microphone signal that includes the at least one sound produced by the speaker, and producing an echo cancelled output audio signal by performing echo cancellation upon each of the microphone signals using the input audio signal and the echo reference microphone signal as reference signals.

20 Claims, 6 Drawing Sheets

(56) References Cited

U.S. PATENT DOCUMENTS

| | | | |
|---|---|---|---|
| 2024/0292151 A1* | 8/2024 | Dusan | H04R 1/1041 |
| 2024/0304171 A1* | 9/2024 | Southwell | G10K 11/17823 |
| 2025/0119704 A1* | 4/2025 | Montazeri | G10L 21/0208 |

* cited by examiner

METHOD AND SYSTEM FOR CONTROLLING ECHO CANCELLATION

FIELD

An aspect of the disclosure relates to a system that controls an echo cancellation process. Other aspects are also described.

BACKGROUND

Many devices today, provide users with the ability to stream media content over the Internet. For example, a digital media player is an electronic device that may be electronically coupled (or a part of) a playback device, such as a television, and may be configured to stream content, such as movies and television shows, for playback on the television. This content may be selected by users (e.g., through a graphical user interface that is displayed on the television), and streamed from one or more content providers that provide the content on a subscription basis.

SUMMARY

An aspect of the disclosure is a method performed by a media source device, such as a digital media player that has several microphones, which may be arranged to capture sound of the ambient environment. The source device receives an input audio signal (e.g., via a computer network, such as the Internet), which may include user-desired media content (e.g., a musical composition, a sound track of a motion picture, etc.). The source device provides the input audio signal to a media playback device that is communicatively coupled to a speaker. For example, the playback device may be a television or a smart speaker in which the speaker is integrated. As another example, the playback device may be a home theater system and the speaker may be a standalone speaker that is coupled to the system. The source device receives, from the microphones, microphone signals that includes sound within the ambient environment in which the media source device is located and at least one sound of the input audio signal produced by the speaker. The source device produces, using a machine learning (ML) model that has input based on the microphone signals and the input audio signal, an echo reference microphone signal that includes the at least one sound produced by the speaker. The source device produces an echo cancelled output audio signal by performing echo cancellation upon each microphone signal using the input audio signal and the echo reference microphone signal as reference signals.

In one aspect, the source device further performs, upon each microphone signal, echo cancellation using the input audio signal (e.g., as a reference input) to determine an estimate of echo in the microphone signal, and produces an indicator of echo activity from one or more (e.g., all) determined estimates, where the input into the ML model includes the microphone signals and the indicator of echo activity. In another aspect, the source device applies a latency upon each of the microphone signals. In particular, the latency may be applied prior to performing the echo cancellation to produce the echo cancelled output audio signal. In some aspects, each performance of the echo cancellation produces an echo cancelled signal and an estimate of echo for each microphone signal, where producing the echo cancelled output audio signal includes using a ML noise suppression model that has input based on each echo cancelled signal and each estimate, and in response, outputs the echo cancelled output audio signal.

In one aspect, the input audio signal is one of several input audio signals obtained by the media source device, and the media playback device is communicatively coupled to several speakers, the source device provides the input audio signals to the media playback device that is configured to use at least a portion of each input audio signal to drive at least one speaker, and producing, using the ML model that has input based on the microphone signals and the input audio signals, several echo reference microphone signals, each echo reference microphone signal being associated with a respective input audio signal of the several input audio signals. In one aspect, the number of input audio signals may be different than the number of speakers. For example, the input audio signals may include two stereo channels, whereas the playback device may be playing back the input audio signals through a multi-channel (e.g., a 5.1) surround sound speaker system. In some aspects, the echo cancelled output audio signal is produced by performing echo cancellation upon each of the microphone signals using the several input audio signals and the echo reference signals.

In one aspect, the input audio signal is a downlink audio signal of a call that is established between the media source device and an electronic device (e.g., a smart phone). In another aspect, the media source device establishes a call with the smart phone to receive a downlink audio signal, where the input audio signal includes the downlink audio signal of the call. In which case, the media source device may perform echo cancellation in order reduce (or suppress) echo of sound output of the speaker that is captured by the microphone of the source device. The media source device transmits the echo cancelled output audio signal to the electronic device as an uplink audio signal (e.g., which may contain mostly speech of a user of the media source device) during the call. In another aspect, the media source device may receive the input audio signal that includes speech of a virtual personal assistant that was triggered by a user of the media source device. In some aspects, the echo reference microphone signal represents a driver signal used by the media playback device to drive the speaker to produce the sounds, the driver signal being based on the input audio signal.

According to another aspect of the disclosure, a method performed by a programmed processor of a system that includes a media source device that is communicatively coupled to a media playback device, the system receives an input audio signal and a microphone signal from at least one microphone of the media source device, where the microphone signal includes sound of the input audio signal played back by the media playback device. The system generates an estimate of the echo in the microphone signal by performing echo cancellation on the microphone signal using the input audio signal, and generates an echo reference microphone signal based on the microphone signal and the estimate of echo.

In one aspect, the audio signal includes a different number of audio channels than audio channels of the input audio signals. For example, the audio signal may include six channels of a surround sound format (e.g., 5.1 format), whereas the input audio signal includes two stereo channels. In one aspect, the system produces an average estimate form at least some of the generated estimates, where the echo reference microphone signal is generated based on the average estimate.

In one aspect, the system produces an average estimate from at least some of the generated estimates, where the echo reference microphone signal is generated based on the average estimate. In another aspect, the microphone signal further includes sound captured form within an ambient environment in which the media source device is located. Generating the echo reference microphone signal includes applying the average estimate and the microphone signal as input into a ML model that suppresses the sound to produce the echo reference microphone signal as output. In another aspect, the microphone signal also includes sounds of an ambient environment in which the media source device is located, where generating the echo reference microphone signal comprises using the generated estimate of echo to suppress the sounds within the microphone signal.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Figure 1:
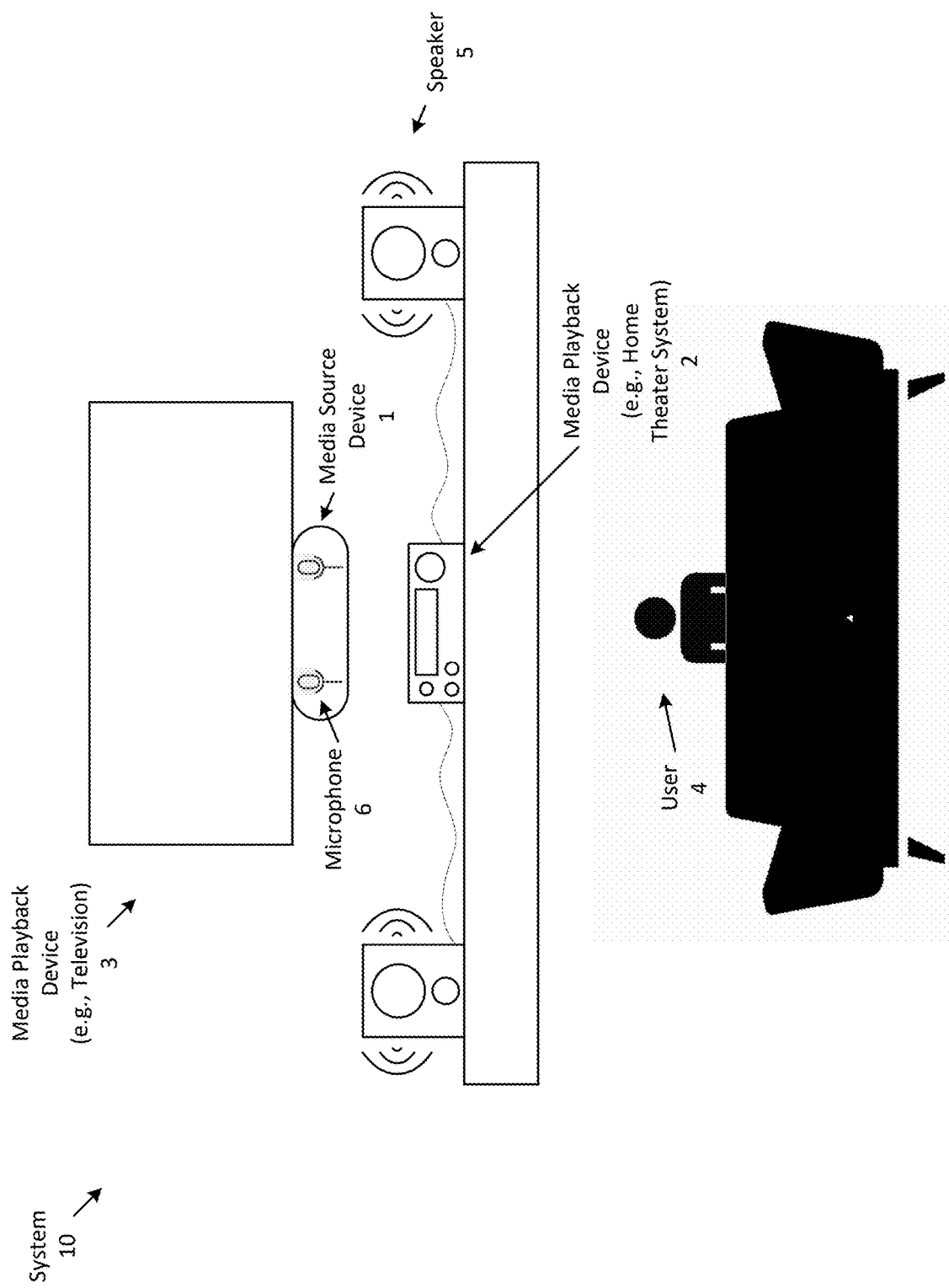
FIG. 1 shows a system that includes a media source device that is streaming media content to a media playback device for playback to a user, and is controlling echo cancellation that is being performed by the media source device.

FIG. 1 shows a system 10 that includes a media source device 1 that is streaming media content to one or more media playback devices for playback to a user. In particular, the system includes 1 the media source device 1, and two media playback devices 2 and 3, which are positioned in front of a user 4, who is sitting on a couch (e.g., at a particular distance away from the devices, such as two to four meters away). As shown, the media playback device 3 is an electronic device with a display screen (e.g., a television) that is configured to display video content and/or playback audio content (e.g., associated with the video content). The media playback device 2 is an electronic device that is configured to playback audio content. As illustrated, the playback device 2 is a home theater system that is communicatively coupled to (at least) two (e.g., front) speakers 5 that are arranged to playback (e.g., stereo) audio content. In one aspect, the device 2 may be coupled to each speaker via a (respective wire), and/or may be wirelessly coupled. Although shown has having two speakers, the system may include more (or less) speakers, such as a 5.1 surround sound theater system that includes an additional front center speaker, two rear surround speakers, and a subwoofer.

In one aspect, the media source device 1 may be communicatively coupled to both playback devices. For example, in the case where the media playback devices create a home theater system, the source device may be connected to the devices via one or more wires (e.g., a High-Definition Multimedia Interface (HDMI) cable), and/or may be wirelessly connected to one or both devices (e.g., through BLUETOOTH protocol). In some aspects, the media source device may be configured to stream media content (e.g., which may be retrieved from the Internet and/or local memory) onto one or both playback devices. In one aspect, "media content" as described herein may include (any type) of video (or image) content and/or audio content. For example, the source device may stream user-desired media content, such as musical compositions for playback through (the speakers 5 of) the media playback device 2. In which case, the media source device may receive one or more input audio signals that include audio content of the user-desired media content, and transmit the signals to the media playback device 2, which uses the signals to drive one or more of the speakers 5. As another example, the source device may stream video and audio content, such as a motion picture for video playback through the television 3 and audio playback (of audio content associated with the motion picture) through the home theater system 2. In another aspect, the audio content may be streamed through one or more (built-in) speakers of the television.

The media source device 1 also includes one or more microphones 6 (illustrated as having two microphones) that are arranged to capture one or more sounds from the ambient environment. The captured microphone signals may allow the media source device to perform one or more user-desired operations based on speech of the user 4 captured by the microphones. For example, the media source device may be configured to allow the user to conduct a conversation with a virtual personal assistant (VPA) or voice assistant, which is a software application that may be executing on the source device. In particular, the source device may include a key-phrase detector that monitors microphone signals for key-phrases spoken by the user that may be used to trigger the VPA. Once triggered, the user may issue verbal commands or instructions for the VPA to respond and/or perform one or more actions. Such commands may include "What time is it?", to which the VPA may issue an audible response of "It is five o-clock." Specifically, the source device may produce an audio signal, which it provides to the media playback device 2 for playback through one or more of the speakers 5. As another example, the media source device may be configured to establish and engage in a telephony (or voice-only) call in which the media source device and one or more far-end devices exchange audio data. In which case, the media source device (which is a near-end device) may transmit microphone signals captured by the microphones 6, which include speech of the (near-end) user 4, as an uplink signal to the far-end device(s) for playback on one or more speakers of the far-end device(s).

In one aspect, the media source device may be configured to playback user-desired media content as well as (e.g., contemporaneously) capture sounds (e.g., the user's speech) of the ambient environment, which may be used for one or more (user-desired) applications. For example, the media source device may be capable of engaging in a (e.g., telephony and/or video conference) call (e.g., via Voice over Internet Protocol (VOIP)) in which the (microphone 6) of the source device captures speech of the user 4 as an uplink signal of the call, while one or more speakers 5 are used to output a downlink signal of the call that includes speech of a far-end user. As another example, the media source device may engage in a call, while performing a joint media playback session with one or more other devices (e.g., devices that are engaged in the call) in which (at least some of) the devices simultaneously playback media content (e.g., a musical composition, a motion picture, etc.) along with the media source device. Conducting a call while engaged in a joint media playback session allows the user 4 to conduct a conversation with other users who are listening and/or watching the same content as the user (through their own playback devices). As another example, the user 4 may conduct a conversation with a VPA, while media content is being played back by the source device.

Playing back user-desired media content (e.g., a musical compositions) through speakers of a playback device while (e.g., contemporaneously) using captured microphone signals to perform user-desired applications (e.g., performing a call during a joint media playback session or attempting to conduct a conversation with a VPA) may result in acoustic echo being captured within the microphone signal. Specifically, acoustic echo is a phenomenon in which sounds produced by one or more speakers are captured by a microphone (e.g., of a source device that is playing back the sounds). In the case of a call, for example, the sounds may include the speech of a far-end user, which results in delayed echo being contained within the microphone (and therefore uplink) signal, which may be very distracting to the far-end user. In the case of a conversation with a VPA, speech of the VPA may be captured, which may result in the user's speech being unintelligible (and therefore the VPA may be unable to decipher a user's verbal command).

To reduce (or eliminate) echo, some electronic devices, such as smartphones may employ signal processing operations such as echo cancellation in which a microphone signal is processed using an audio signal (or driver signal) used to drive a speaker of the device as a reference input signal, to produce a linear echo estimate that represents an estimate of how much of the audio signal is in the microphone. Specifically, the device may determine a linear filter based on a transmission path between the microphone and the speaker, and apply the filter to the audio signal to generate the estimate of echo, which is subtracted from the microphone signal to produce a "clean" or echo-cancelled signal, which includes less (or none of the) echo from the speaker.

In one aspect, a system in which a media source device plays back audio through a (separate) media playback device may be unable to effectively eliminate echo using (solely) the audio signal (or driver signal) as a reference signal for echo cancellation. As described herein, the media source device 1 transmits an input audio signal, which may include media content and/or speech content (e.g., of a far-end user during a call) to the media playback device 2 for playback (which may be the case when the media source device is engaged in a call along with in a joint media playback session). In one aspect, the playback device may perform one or more digital signal processing operations upon the input signal. For example, when the media playback device is a 5.1 surround sound system and the input audio signal includes less audio channels than the system uses (e.g., the input audio signal being a stereo signal with two channels), the media playback device may upmix the input audio signal to produce six channels, each used to drive one or more speakers. As another example, the media playback device 2 may perform operations, such as audio compression, loudness normalization, spectral shaping (e.g., equalization), downmixing, limiter, and/or clipping. The performance of these operations, however, may be unknown to the media source device, since these operations are being performed by the media playback device (downstream). As a result, the original input audio signal may be insufficient for estimating the echo, since this signal may be different than the driver signal used to drive one or more speakers of the media playback device 2. Moreover, the echo path between the (e.g., microphone 6 of the) media source device 1 and the (e.g., speaker 5 of the) media playback device 2 may be unknown (e.g., due to the speaker 5 being a separate electronic device from the media source device).

To solve these problems, the present disclosure describes a system 10 that controls echo cancellation that is being performed by producing (new) echo reference microphone signals. Specifically, the (e.g., media source device 1 of the) system 10 may receive an input audio signal, which, for example, may include a downlink audio signal of a (e.g., telephony or video conference) call established with another electronic device, where the downlink signal includes speech of a far-end user. As another example, the input audio signal may include speech of a VPA and/or user-desired media content for playback during a VPA conversation with the user 4. As another example, the input audio signal may include stereo channels that have audio content of user-desired media content. The input audio signal may be provided (e.g., transmitted by the media source device) to the media playback device 2 that uses (e.g., a processed version of) the input audio signal to drive one or more speakers. The system may receive microphone signals that include sound within an ambient environment in which the media source device is located (e.g., that may include speech of the user 4) and at least one sound of the input audio signal produced by the speaker of the media playback device (e.g., captured speech of the far-end user). The system produces, using a machine learning (ML) model that has input based on one or more microphone signals captured by microphones 6 and the input audio signal being streamed by the media source device, an echo reference microphone signal that includes sound produced by one or more speakers 5 of the media playback device 2. In other words, the ML model may be trained to reduce (or eliminate) (near-end) sounds of (e.g., speech of the user 4 and/or other sounds emanating from within) the ambient environment in which the media source device is located, in order to produce a reference audio signal (e.g., which includes sound of the input audio signal), which may account for the echo path between the media source device and the (e.g., speaker of the) media playback device. The system may produce an echo cancelled output audio signal (e.g., a clean-voice signal of the user 4, having only (or including a majority of) speech of the user and/or near-end sounds captured by the microphone 6) by performing echo cancellation upon each of the microphone signals using the input audio signal and the produced echo reference microphone signal. Thus, the system is able to control echo cancellation in order to accommodate the additional digital signal processing operations performed by the media playback device (as well as the echo path between the devices) by using the input audio signal and the produced echo reference microphone signal as reference audio signals (for the echo cancellation). In particular, the use of the produced echo reference microphone signal allows the system to cancel any remaining echo (of which the system may be unable to cancel using only the input audio signals as reference signals) due to the echo path.

Figure 2:
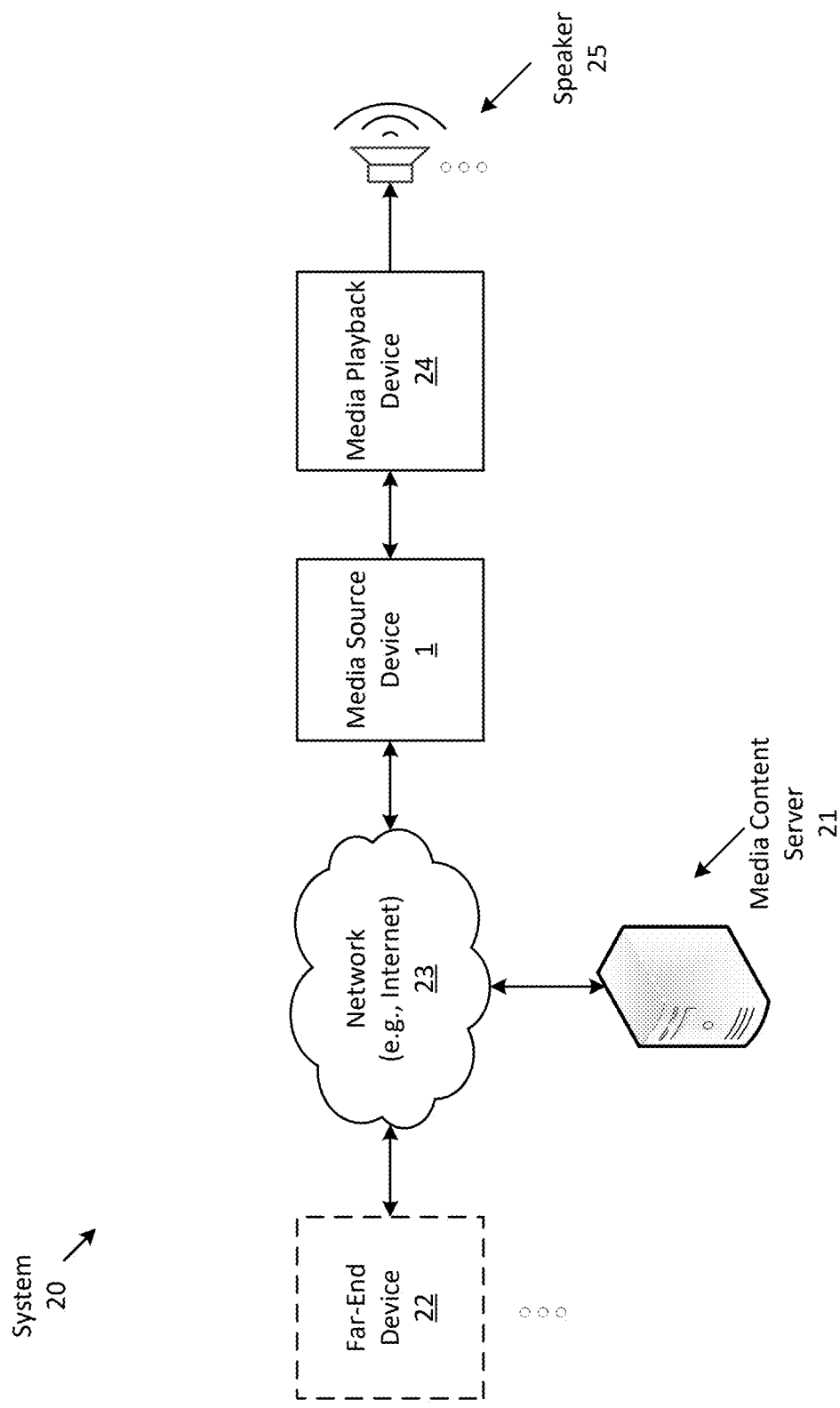
FIG. 2 shows a block diagram of a system that controls echo cancellation according to one aspect.

FIG. 2 shows a block diagram of a system 20 that controls echo cancellation according to one aspect. The system includes a media content server 21, a far-end device 22, a network (e.g., a computer network, such as the Internet), the media source device 1, a media playback device 24 (that may be the same or similar to the playback devices of FIG. 1), and a speaker 25. As shown, the media source device 1 is (e.g., communicatively) coupled to the far-end device 22 and the server 21 via the network 23, and is communicatively coupled, via a data connection, such as a wired connection (e.g., using a HDMI cable) or a wireless connection (using any wireless communication protocol, such as BLUETOOTH protocol), to the media playback device 24, which is communicatively coupled to the speaker 25.

In one aspect, the system may include more or less elements. For example, the system may include two or more speakers 25 (e.g., which may be communicatively coupled to the media playback device 24). As another example, the system may include two or more media playback devices, as illustrated in FIG. 1. As another example, the system may include multiple far-end devices, such as when the media source device is conducting a telephony call with two or more far-end devices. In another aspect, the system may not include far-end devices (e.g., when the media source device is not conducting a call), and as a result are optional (and therefore shown with dashed lines). In some aspects, the system may include one or more remote (electronic) servers that are communicatively coupled with at least some of the devices of system 20, and may be configured to perform at least some of the operations described herein.

In one aspect, the media source device 1 may be any electronic device (e.g., with electronic components, such as a processor, memory, etc.) that is capable of performing digital signal processing operations upon one or more microphone signals and/or one or more input audio signals. For example, the media source device may be a digital media player, a desktop computer, a laptop computer, etc. As another example, the media source device may be a portable electronic device, such as a tablet computer, a smart phone, smart glasses, a smart watch, etc. As described herein, the media source device may be configured to stream media (e.g., audio and/or video) content (e.g., from the media content server 21) for playback on the media playback device 24. In another aspect, the media source device may be capable of engaging in a call, such as a telephony call or a video (conference) call with the far-end device 22 (e.g., with the use of camera 33 shown in FIG. 3). In one aspect, the network may include a Public Switched Telephone Network (PSTN), over which the source device and the far-end device(s) may be capable of placing outgoing calls and/or receiving incoming calls. In some aspects, the source device may be configured to establish an Internet Protocol (IP) telephony (or VoIP) call with one or more far-end devices via the network (e.g., the Internet). In particular, the source device may use any signaling protocol (e.g., Session Initiation Protocol (SIP)) to establish a communication session and use any communication protocol (e.g., Transmission Control Protocol (TCP), Real-time Transport Protocol (RTP), etc.) to exchange audio data during a call. Specifically, the media source device may receive a downlink signal from (each of) the far-end device(s) that may include speech of the far-end user, and transmit an uplink signal that includes speech of the user (e.g., user 4 of FIG. 1) of the media source device. In another aspect, the media source device may perform a joint media playback session with the far-end device, while on a call, as described herein.

In one aspect, the media playback device 24 may be any electronic device that is configured to perform one or more audio signal processing operations and to playback audio (and/or vide) content. Specifically, the playback device may be using one or more audio signals, each of which having at least a portion of the audio content (being streamed by the media source device), to drive the one or more speakers 26 to produce (or project) sound of the (audio content contained within the) audio signal(s) into the ambient environment (e.g., in which the playback device and the media source device are located). For example, the media playback device may perform audio signal processing operations to upmix one or more input audio signals received from the media source device, into more signals (e.g., upmixing two stereo channels into six surround sound channels), where each upmixed signal include at least a portion of at least one of the input audio signals, as described herein. In one aspect, the speaker may be an electrodynamic driver that may be specifically designed for sound output at certain frequency bands, such as a woofer, tweeter, or midrange driver, for example. In one aspect, the speaker 25 may be a "full-range" (or "full-band") electrodynamic driver that reproduces as much of an audible frequency range as possible. In one aspect, the speaker may be an "extra-aural" speaker that is arranged to project (or output) sounds into the ambient environment.

As described herein, the playback device may be coupled to the speaker 26, which may be a separate electronic device. For example, the playback device 24 may be a home theater system, which is coupled to the speaker 26, as a standalone speaker (e.g., similar to device 2 and speaker 5 in FIG. 1). In another aspect, the speaker may be a part (e.g., integrated within a housing) of the playback device 24. For instance, the playback device may be a television (e.g., television 3 in FIG. 1) that includes one or more integrated speakers, a laptop computer, etc. In another aspect, the playback device may be a smart speaker. In another aspect, the media playback device may be a portable electronic device. For instance, the playback device may be smart glasses, a smart phone, or a wearable electronic device (such as a headset or a smart watch).

In some aspects, the media content server 21 may be a stand-alone server computer or a cluster of server computers configured to stream media content to electronic devices, such as the far-end and media source devices. In which case, the server may be a part of a cloud computing system that is capable of streaming data as a cloud-based service that is provided to one or more subscribers. In some aspects, the server may be configured to stream any type of media (or multi-media) content, such as audio content (e.g., musical compositions, audiobooks, podcasts, etc.), still images, video content (e.g., movies, television productions, etc.), etc. In one aspect, the server may use any audio and/or video encoding format and/or any method for streaming the content to one or more devices.

Figure 3:
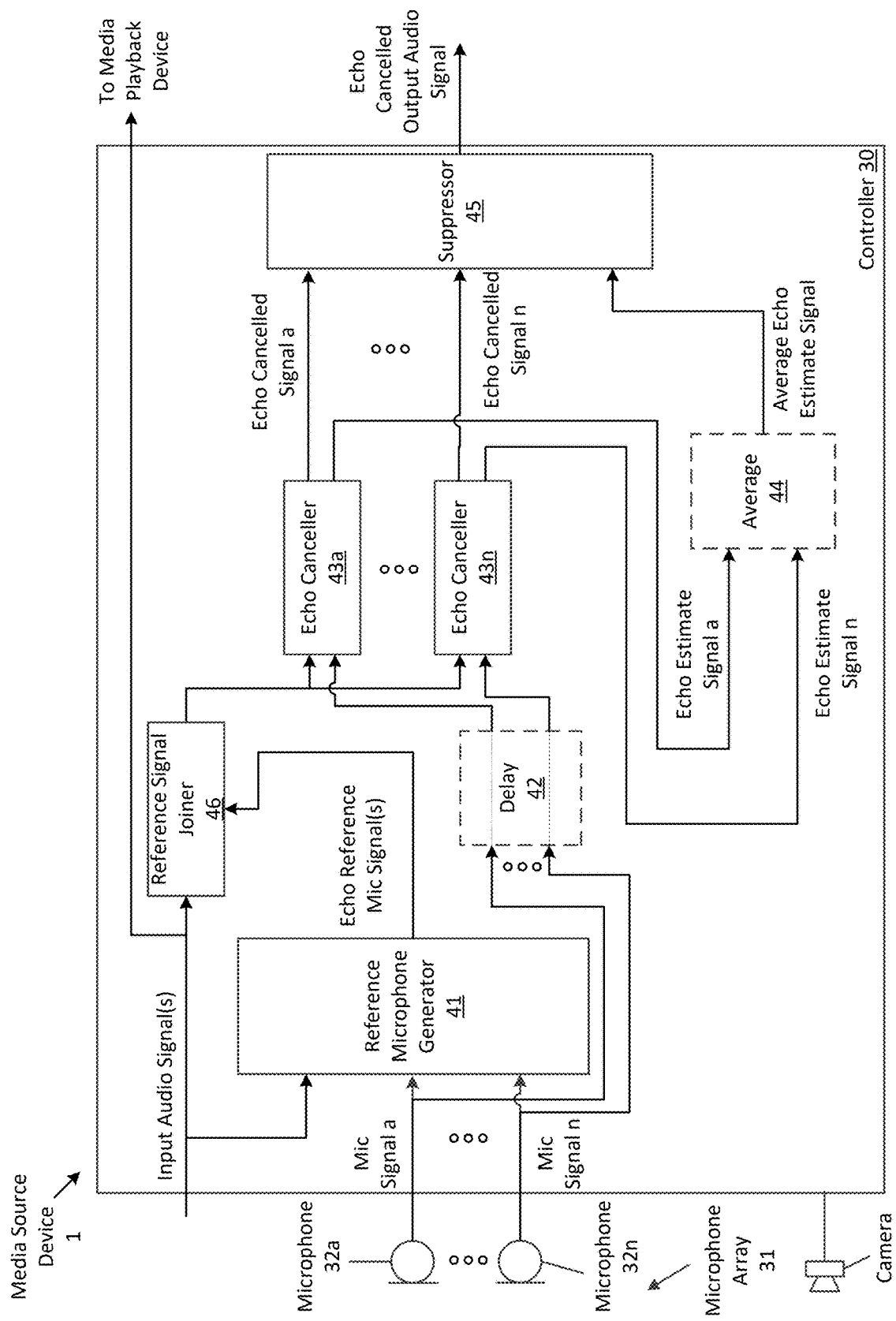
FIG. 3 shows a block diagram of the media source device that is configured to control echo cancellation according to one aspect.

FIG. 3 is a block diagram of the media source device 1 that controls echo cancellation according to one aspect. Specifically, this figure shows components of the source device, which includes a controller 30, microphone array 31 of two or more microphones 32a-32n (which may be referred to as "microphone 32" herein), and a camera 33. In one aspect, the media source device may include more or less elements, such as having a speaker, or having only one microphone.

Each microphone 32 may be any type of microphone (e.g., a differential pressure gradient micro-electro-mechanical system (MEMS) microphone) that is configured to convert acoustical energy caused by sound wave propagating in an acoustic (ambient) environment into a microphone signal. For instance, each microphone may be arranged to capture sounds of the ambient environment in which the media source device is located. In one aspect, the captured sounds may include sounds originating from (objects) within the environment (e.g., speech of user 4) and/or may include sounds produced by one or more speakers (e.g., speaker 25) within the environment.

In one aspect, the camera 33 is a complementary metal-oxide-semiconductor (CMOS) image sensor that is capable of capturing digital images including image data that represent a field of view of the camera 33, where the field of view includes a scene of an environment in which the device 1 is located. In some aspects, the camera may be a charged-coupled device (CCD) camera type. The camera is configured to capture still digital images and/or video that is represented by a series of digital images. In one aspect, the camera may be positioned anywhere about the source device. In some aspects, the device may include multiple cameras (e.g., where each camera may have a different field of view). In some aspects, the (e.g., controller 30 of the) media source device 1 may use video data captured by the camera to conduct a video conference call in which video and/or audio captured by the media source device (e.g., by the microphone array and the camera) is transmitted to one or more far-end devices, as described herein.

The controller 30 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). The controller is configured to perform audio signal processing operations and/or networking operations. For instance, the controller 30 may be configured to control acoustic echo cancellation (AEC) that is being performed to eliminate (or reduce) echo within one or more microphone signals to produce an echo cancelled output audio signal. This echo may be captured by microphones 32, which is produced by sound output of one or more speakers of a media playback device. In one aspect, the echo cancelled output audio signal may include one or more sounds of the ambient environment (e.g., speech of a user), which may be used to for one or more user-desired applications, as described herein. More about the operations performed by the controller 30 is described herein.

As shown, the controller 30 includes several operational blocks to perform one or more of the audio signal processing operations described herein. For instance, the controller includes a reference microphone generator 41, a (optional) delay 42, one or more echo cancellers 43a-43n, an (optional) average 44, a suppressor 45, and a reference signal joiner 46. The controller 30 is configured to receive one or more input audio signals. For example, the input audio signals may include audio data (content) of media content that is being streamed by the media source device (e.g., from the media content server 21. In another aspect, the audio signals may include one or more downlink signals from one or more far-end devices with which the media source device 1 is conducting a call. In which case, the controller may be configured to establish a call with an electronic device (e.g., the far-end device 22 of FIG. 2) to receive the downlink audio signal, which may be (a part of) the one or more input audio signal(s).

In another aspect, the input audio signal(s) may (also) include one or more verbal responses (as audio data) of a VPA, with which the user of the media source device is having a conversation. In particular, the input audio signal(s) may include speech of the VPA, which may have been triggered by the user of the media source device. Specifically, the speech of the VPA may be received in response to the user triggering the VPA (e.g., the user saying a trigger phrase or saying a verbal command). In some aspects, each of the input audio signals may be a mix of at least some of the audio content described herein. For example, the input audio signal(s) may include audio content and one or more verbal responses of the VPA. In other aspects, the input audio signals may include (or be) one or more audio channels. For example, the received input audio signal may include a mono audio channel, or may include multi-audio channels, such as two or more audio stereo channels (e.g., a left audio channel and a right audio channel), six surround sound channels (e.g., of a sound track of a movie in 5.1-surround format), etc.

The controller 30 is configured to transmit (or provide) the one or more input audio signals to the media playback device 24 for playback through one or more speakers of (or coupled to) the playback device. For example, the input audio signal may be transmitted via a wired connection and/or via a wireless connection (e.g., over BLUETOOTH), as described herein. In one aspect, the media playback device may be configured to use the input audio signal to drive the one or more speakers. In some aspects, the playback device may be configured to process the input audio signal to produce one or more audio signals (e.g., driver signals) for driving the speakers. As described herein, the playback device may perform any type of digital audio signal processing operation, such as upmixing the input audio signal based on a number of channels through which the playback device outputs sound (e.g., which may be based on having a different number of speakers than the received input audio signals). The controller is also configured to receive, from (at least one) of the microphones 32a-32n, microphone signals that include sound of the ambient environment. As describe herein, the microphones may capture speech of the user and capture the (sound of the) audio signal(s) used to drive the speakers of the playback device.

In another aspect, the media source device 1 may not transmit the input audio signal(s) to the media playback device 24. In which case, the controller may be configured to receive the input audio signal(s) as reference signals for use in one or more echo cancellation operations described herein. In addition, the media playback device may be configured to retrieve the input audio signal(s) separately (e.g., via a communication data link with the media content server 21 and/or from local memory).

The one or more operations performed by the controller's operational blocks will now described. The reference microphone generator (or near-end suppressor) 41 is configured to receive the one or more microphone signals (mic signals a-n) from the microphones 32a-32n and the input audio signal(s), and is configured to produce one or more echo reference microphone signal(s) based on at least one of the received signals, where each of the echo reference microphone signals includes at least one sound of the input audio signal produced by one or more speakers of the media playback device. For example, the generator uses a machine learning (ML) model that has input based on (one or more of) the microphone signals and (one or more of) the input audio signal(s), and is configured to suppress (reduce) near-end sounds (e.g., speech of user 4 of FIG. 1 and/or other ambient sounds) captured by the microphones within the ambient environment in which the media source device is located. As a result, the reference signals produced by the generator may (e.g., primarily) include sounds produced by (e.g., the speaker(s) of the) media playback device, and therefore captures the echo (e.g., path) components produced by the playback device. More about the ML model and the operations performed by the reference microphone generator is described herein.

With the suppression of the near-end sounds, the echo reference microphone signals may include (at least a portion of the) audio signals played back by the media playback device (e.g., used to drive one or more speakers of the playback device). In one aspect, the audio signals played back by the media playback device may be based on the input audio signals (e.g., which the source device transmits to the playback device for playback). As described herein, the playback device may perform one or more audio digital signal processing operations upon the input audio signals, thereby modifying the input audio signals. In which case, the audio signals used by the playback device may be processed (different) versions of the input audio signals. In another aspect, the echo reference microphone signals may capture extra echo components in the input audio (playback) signal of the media source device. More about the echo reference microphone signals is described herein.

In one aspect, the generator 41 may produce a same number of echo reference microphone signals as a number of input audio signals. For example, when the input audio signals include two stereo channels, the generator may produce two echo reference microphone signals. In another aspect, the echo reference microphone signals may correspond (or have a same format) as the input audio signals. Continuing with the previous example, the two echo reference microphone signals may be two stereo channels. In another aspect, the number of echo reference microphone signals may be the same (or different) to the number of speakers used by the playback device to output the audio signals. For instance, when the media playback device is a 5.1 surround sound home theater system, the number of echo reference microphone signals produced may include one or more reference audio signals.

The (optional) delay 42 is configured to apply a latency (e.g., delay for a period of time) upon each of the microphone signals. In one aspect, the delay in may be based on the processing time for the reference microphone generator 41. In one aspect, the latency may be predefined. In some aspects, the delay may be adjustable based on the processing operations performed by the generator 41. In some aspects, the delay allows the produced echo reference microphone signals to be aligned with the (original) microphone signals and/or the input audio signals. In some aspects, the delay may be applied to the echo reference microphone signals instead of the microphone signals. In some aspects, the delay may be optional based on whether the echo reference microphone signals and microphone signals maintain a causal relationship between each other (e.g., have a threshold of cross-correlation). Thus, if both (groups of) signals maintain a causal relationship, the delay may be omitted.

The reference signal joiner 46 is configured join (or group) the input audio signal(s) with the echo reference microphone signal(s). For example, when the input audio signals include two audio signals (e.g., two stereo channels) and the echo reference microphone signal(s) include two audio signals, the joiner combines the two separate stereo channels into four audio channels. Thus, the joiner groups the signals into multi-channel reference audio signals for the echo cancellers.

Each of the echo cancellers 43a-43n is configured to cancel (or reduce) linear components of echo within respective microphone signals by determining an estimate of echo (within the microphone signal) using the (or at least some) input audio signal(s) and the echo reference microphone signal(s) as reference signals. Specifically, each echo canceller performs acoustic echo cancellation process upon its respective microphone signal using the input audio signal(s) and echo reference microphone signal(s) as reference inputs, to produce the linear estimate of echo (as an echo estimate signal) that represents an estimate of how much of these reference inputs are in the microphone signal. Each of the echo cancellers subtract the echo estimate signal from the microphone signal to produce a respective echo cancelled signal. For example, the echo canceller 43a produces the echo cancelled signal a, and produces linear echo estimate signal a. Thus, each echo cancelled signal produced by each canceller has less (or no) echo than its corresponding microphone signal.

In one aspect, the echo cancellers may use a portion of the reference signals described herein to perform the echo cancellation process. For example, at least one of the echo cancellers may use one or more of the echo reference microphone signals, without the input audio signals as reference signals. In another aspect, the echo cancellers may use one or more input audio signals as reference signals for performing the echo cancellation.

The average 44 is configured to receive the echo estimate signals a-n produced by the echo cancellers 43a-43n, and is configured to produce an average estimate of one or more determined estimates of echo. Specifically, the average produces an average echo estimate signal that may be based on all of the determined estimates. For example, the average being the mean, median, or mode of all of the determined estimates. In another aspect, the average may be based on one or more (or a subset of) the determined estimates. For example, the average may be based on a subset (one or more) determined estimates, such as being the highest or lowest estimate.

The suppressor 45 is configured to receive (at least some of) the echo cancelled signals a-n and the average echo estimate signal from the average 44. In one aspect, the average may be optional, in which case the suppressor may receive (at least some of) the echo estimate signals from the echo cancellers. In one aspect, the suppressor may be a ML noise suppression model that has input based on each echo cancelled signal a-n and each echo estimate signal (or the average echo estimate signal), and in response, outputs the output audio signal. In particular, the suppressor 45 suppresses one or more audio components of at least some of the echo cancelled signals to perform voice isolation of the near-end user to produce an echo cancelled output audio signal. Specifically, the suppressor may suppress at least one of residual echo, ambient noise, competing speech (e.g., speech of other users within the room), and reverberation to isolate the user's (e.g., user 4 in FIG. 1) speech. In one aspect, (at least some of) the echo cancellers 43*a*-43*n* do not cancel echo completely (e.g., within a threshold). In which case, the suppressor reduces this residual echo (and any residual speech that is not of the user) in order to produce the echo cancelled output audio signal that has a reasonable speech quality (e.g., above a threshold). In some aspects, the output audio signal is produced such that the ratio between the residual echo vs near-end speech of the user is less than 0 dB. In one aspect, the ML noise suppression model may be any type of ML model that is trained in a controlled environment (e.g., a laboratory) to produce one or more echo cancelled output audio signals based on the input described herein.

In one aspect, this signal may be used for user-desired applications, such as being used as an uplink signal that is sent to one or more far-end devices during an established call between those devices and the media source device. Thus, the controller may be configured to transmit the output audio signal(s) to the one or more far-end devices as an uplink signal during a call. In another aspect, this signal may be used by the VPA algorithm as voice commands, as described herein.

In one aspect, the controller may be configured to perform (additional) audio signal processing operations based on elements that are coupled to the controller. For example, the controller may include a sound-pickup beamformer that can be configured to process the audio (or microphone) signals produced two or more external microphones of the output device to form directional beam patterns (as one or more audio signals) for spatially selective sound pickup in certain directions, so as to be more sensitive to one or more sound source locations. In some aspects, the controller may perform audio processing operations upon the audio signals that contain the directional beam patterns (e.g., perform spectrally shaping), and/or transmit the audio signals to the local device.

Figure 4:
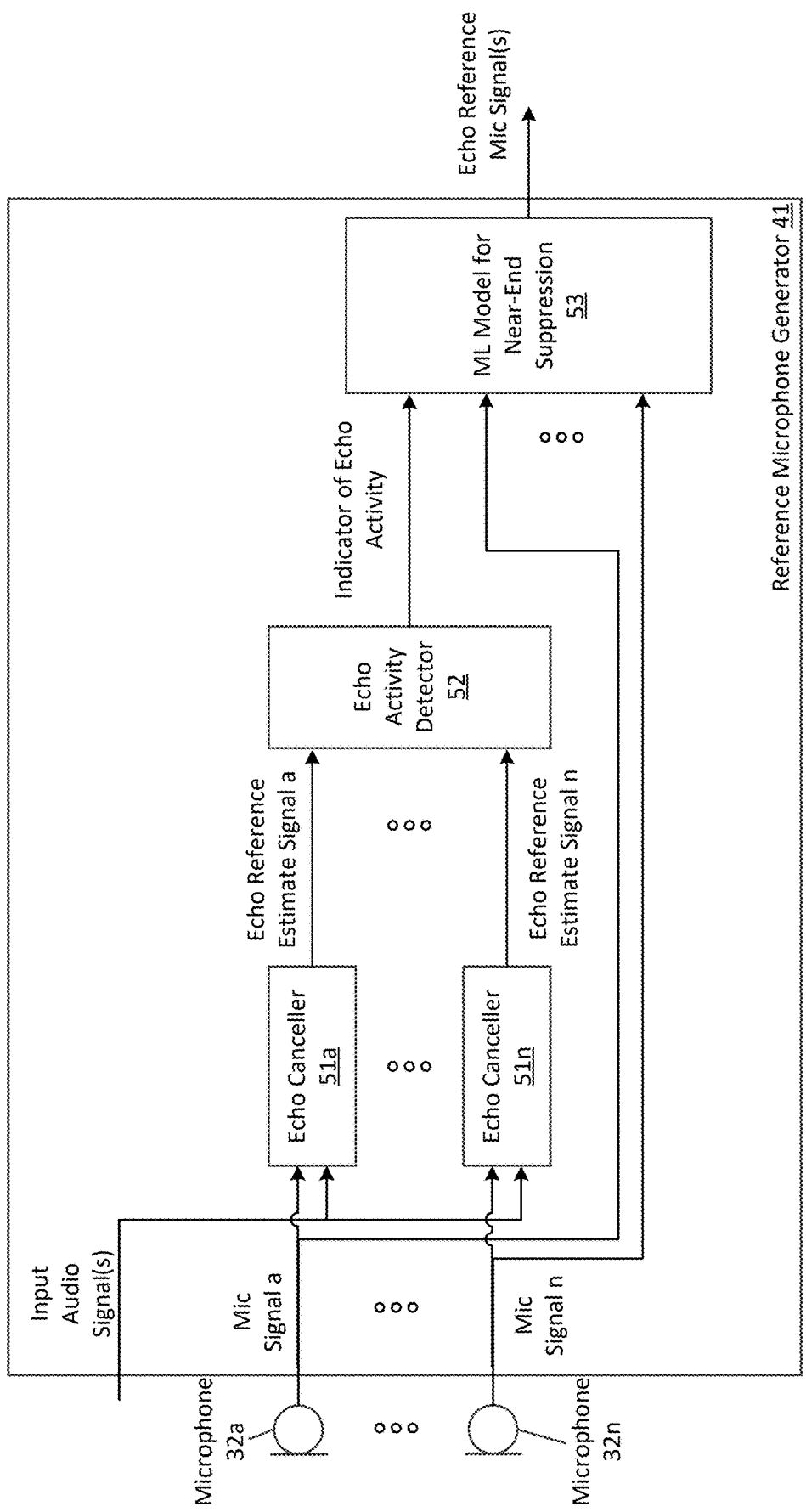
FIG. 4 is a block diagram of a reference microphone generator that is producing one or more echo reference microphone signals for controlling echo cancellation according to some aspects.

FIG. 4 is a block diagram of the reference microphone generator 41 shown in FIG. 3 that is producing one or more echo reference microphone signals for controlling echo cancellation according to some aspects. The generator includes operational blocks, such as one or more echo cancellers 51*a*-*n*, an echo activity detector 52, and a ML model for near-end suppression 53. As shown, each echo canceller 51*a*-51*n* is configured to receive the input audio signal(s) and at least one microphone signal. For example, echo canceller 51*a* receives mic signal a captured by microphone 32*a* and the input audio signal(s). Each canceller performs echo cancellation to produce a respective linear estimate of echo, as an echo reference estimate signal. As shown, the generator includes an echo canceller 51 for each microphone 32. In another aspect, the generator 41 may have less echo cancellers, such as having an echo canceller for two or more microphones, such that the canceller estimate the echo from two or more microphone signals.

The echo activity detector 52 is configured to receive the echo reference estimate signals a-n produced by cancellers 51*a*-51*n*, and is configured to produce an indicator of echo activity from (or within) the echo reference estimate signals. In one aspect, the indicator may be a scalar value or a vector. In another aspect, the indicator may be an average of the echo reference estimate signals (e.g., being an average echo reference estimate signal). In which case, the detector may produce an average estimate from at least some (one or more) of the generated estimates from one or more echo cancellers 51*a*-51*n*.

The ML model for near-end suppression 53 is configured to receive the indicator of echo activity and (at least some) of the microphone signals a-n as input, and in response, produce one or more echo reference microphone signals, in which near-end sounds have been suppressed (or reduced by a threshold). In one aspect, the near-end sounds may be any type of sounds originating within the environment in which the media playback device 2 and/or the media source device 1 are located. In another aspect, the ML model may suppress all (or most) near-end sounds, such that the generated echo reference microphone signals include (e.g., only) sounds produced by (e.g., one or more speakers of) the media playback device 2. As a result, the echo reference microphone signals represent the echo path between the source device and the playback device, which may include sounds produced by one or more speakers of the playback device. In one aspect, each echo reference microphone signal represents the audio signal played back by the playback device, as described herein. In one aspect, the ML model suppresses near-end speech by finding echo features from one or more microphone signals, using the indicator. For example, the ML model finds echo temporal features from the microphone signal, and uses those features to produce a clean echo reference signal.

In one aspect, the ML model 53 may be neural network (e.g., convolution neural network, recurrent neural network, etc.) that is configured to produce echo reference microphone signal(s) based in input of the indicator of echo activity and microphone signals. In another aspect, the ML model may be any type of ML model. In one aspect, the ML model may be trained to produce the same number of reference microphone signals as the input audio signals (e.g., producing stereo signals in response to receiving stereo input audio signals). In another aspect, the ML model may be adaptable, such that the number of reference microphone signals may be based on the number of speakers of the media playback device. In some aspects, the ML model may be configured to produce echo reference microphone signals up to the number of microphones of the microphone array 31.

As described herein, the system may include one echo canceller per microphone signal. For example, FIG. 3 shows that the controller includes echo cancellers 43*a*-43*n*, each associated with a respective microphone signal captured by microphones 32*a*-32*n*. Thus, the controller (and/or the reference microphone generator 41) may include n echo cancellers to n microphones. In another aspect, rather than having a respective echo canceller per microphone, the system may include one echo canceller that receives all reference signals and all microphone signals for performing echo cancellation.

Figure 5:
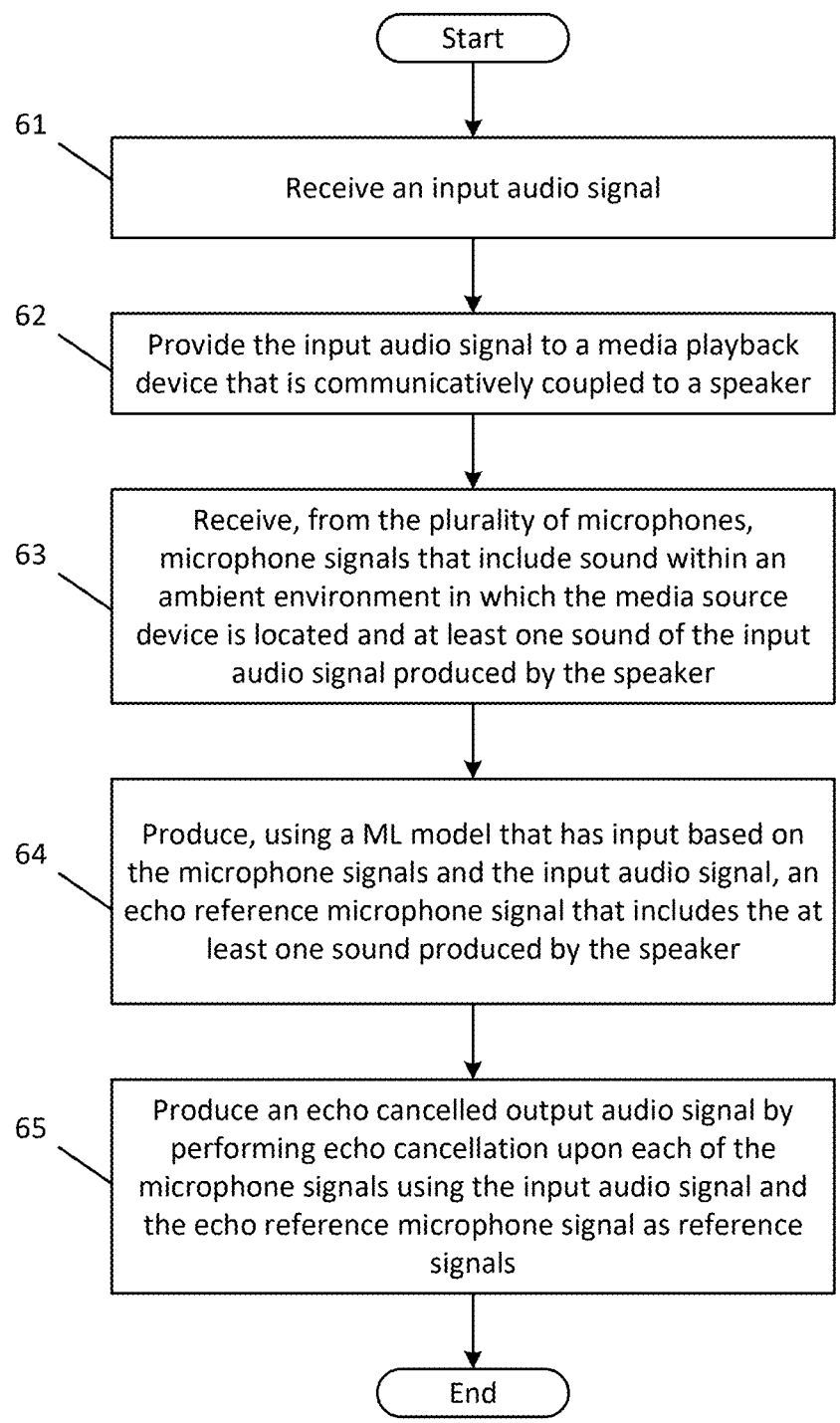
FIG. 5 is a flowchart of one aspect of a process for controlling echo cancellation.
Figure 6:
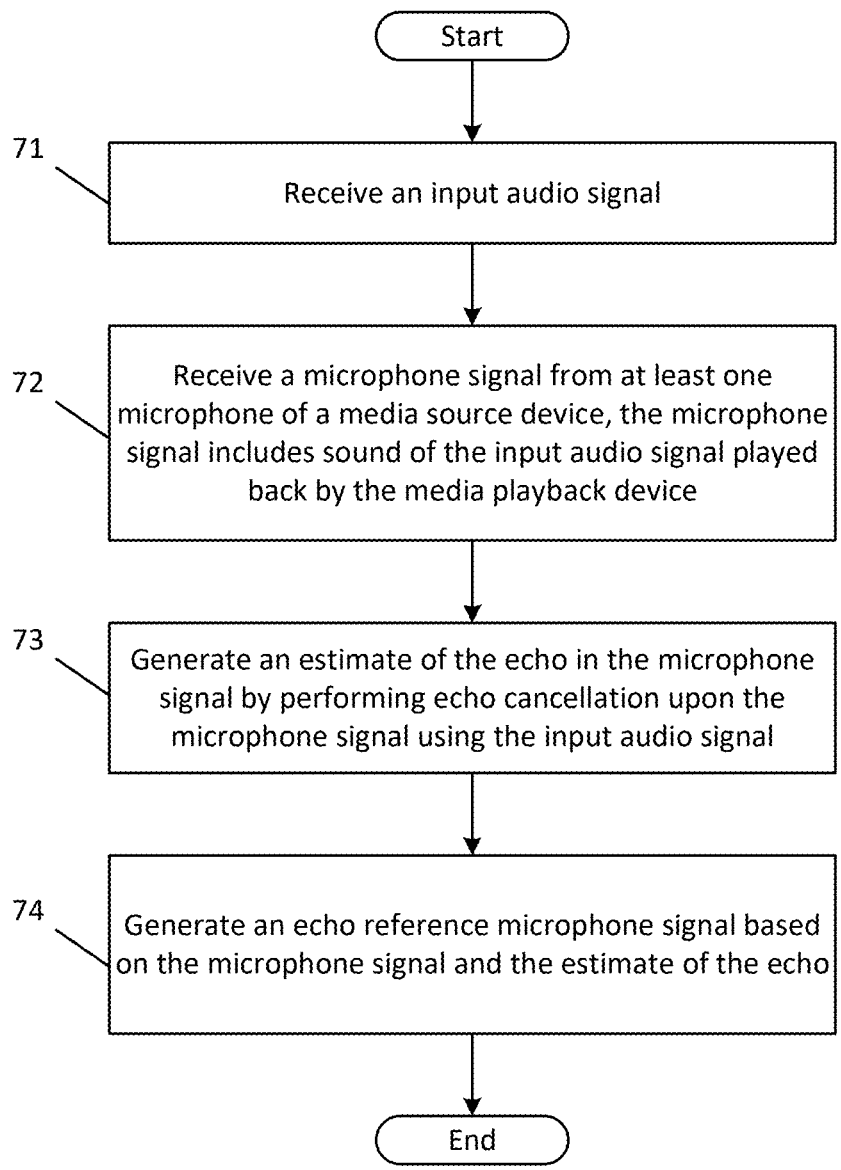
FIG. 6 is a flowchart of one aspect of a process for producing one or more echo reference microphone signals.

FIGS. 5 and 6 are both flowcharts of processes 60 and 70, respectively, that may be performed by (e.g., controller 30 of the media source deice 1 of) the system 10. Thus, this figure will be described with reference to FIGS. 2 and 3.

Turning to FIG. 5, this figure is a flowchart of one aspect of a process 60 for controlling echo cancellation. In one aspect, the process 60 may be performed by (e.g., controller 30 of the media source deice 1 of) the system 10. Thus, this figure will be described with reference to FIGS. 2 and 3. The process 60 begins by receiving an input audio signal (at block 61). In one aspect, the signal may include (or be) one or more channels, such as including two stereo channels. The signal(s) may include any type of content, such as user-desired media content, speech of a telephone call, and/or speech of a VPA, as described herein. The controller provides the input audio signal to a media playback device (e.g., device 24 of FIG. 2) that is communicatively coupled to a speaker (at block 62). For instance, the controller may transmit (e.g., stream) the input audio signal to the media playback device via a wired data connection, such as a HDMI cable that connects the media source device to the media playback device.

The controller receives, from the microphones 32a-32n of the microphone array 31, microphone signals that include sound within the ambient environment in which the media source device is located and at least one sound of the input audio signal produced by the speaker (at block 63). For example, when the input audio signal includes speech of a VPA, at least some of the microphone signals may capture (at least some of) this speech being played back by (one or more speakers of the) playback device. The controller produces, using a ML model (e.g., ML model 53) that has input based on the microphone signals and the input audio signal, an echo reference microphone signal that includes the at least one sound produced by the speaker (at block 64). Specifically, the input of the ML model includes at least some of the microphone signals and an indicator of echo activity within the microphone signals. The echo reference microphone signal may represent the echo path between the (e.g., one or more microphones of) the media source device and the (e.g., one or more speakers of) the media playback device. In one aspect, the echo path may not include near-end sounds, such as environmental noise within the ambient environment in which the media source device (and the media playback device) is located.

In one aspect, the ML model may produce a same (or different) number of echo reference microphone signals as the number of input audio signals. For instance, the input audio signal may include one or more signals (channels), such as having two stereo channels. In which case, the ML model may produce several echo reference microphone signals, each signal being associated with a respective channel.

The controller 30 produces an echo cancelled output audio signal (e.g., a clean near-end voice signal) by performing echo cancellation upon each of the microphone signals using the input audio signal and the echo reference microphone signal as reference signals (at block 65). Specifically, the echo cancellers 43a-43n produce echo cancelled signals a-n from the microphone signals a-n, using the input audio signal and echo reference microphone signal as reference inputs. From the produced echo cancelled signals, the controller applies suppression operations using the input audio signal and the echo reference microphone signal to produce the echo cancelled output audio signal.

FIG. 6 is a flowchart of one aspect of a process 70 for producing one or more echo reference microphone signals. In one aspect, at least some of the operations in process 70 may be performed by the controller at block 64 of process 60 in FIG. 5. In one aspect, the operations may be performed by the reference microphone generator 41 of controller 30. The process 70 begins by the controller receiving an input audio signal (at block 71). The controller receives a microphone signal from at least one microphone of the media source device, the microphone signal includes sound of the input audio signal played back by the media playback device (at block 72). As described herein, the input audio signal may be transmitted to the media playback device for processing and playback. Specifically, the media playback device may process the input audio signal by performing one or more audio signal processing operations upon the signal to produce one or more audio (driver) signals, which may be used by the media playback device for driving one or more speakers. As a result, the microphone may capture the (e.g., sounds of the) audio driver signal(s) being played back by the speakers, which may be a processed version of the input audio signal(s) (e.g., including at least a portion of audio content of the input audio signal).

The controller generates an estimate of the echo in the microphone signal by performing echo cancellation on the microphone signal using the input audio signal (at block 73). For example, an echo canceller (e.g., 51a) produces an echo reference estimate signal a as the estimate. The controller generates an echo reference microphone signal (being played back by the media playback device) based on the microphone signal and the estimate of the echo (at block 74). Specifically, the ML model for near-end suppression 53 produces the echo reference microphone signal based on an indicator of echo activity and the microphone signal. In one aspect, the suppression suppresses near-end sounds originating from the ambient environment that are captured by the one or more microphones. In one aspect, the echo reference microphone signal may represent the audio signal(s) being played back by the media playback device. IN one aspect, Some aspects perform variations of the processes 60 and 70 described in FIGS. 5 and 6. For example, the specific operations of at least some of the processes may not be performed in the exact order shown and described. The specific operations may not be performed in one continuous series of operations and different specific operations may be performed in different aspects. In one aspect, at least some of the operations described in these processes may be performed in response to detecting speech of the user. For instance, the controller may perform a speech recognition algorithm, which processes one or more microphone signals to detect speech contained therein. Upon detecting speech, the controller may control echo cancellation in order to produce the echo cancelled output audio signal.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As previously explained, an aspect of the disclosure may be a non-transitory machine-readable medium (such as microelectronic memory) having stored thereon instructions, which program one or more data processing components (generically referred to here as a "processor") to perform the network operations and audio signal processing operations, as described herein. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by a media source device that has a plurality of microphones, the method comprising:
  receiving a first input audio signal;
  providing the first input audio signal to a media playback device that is communicatively coupled to a speaker;
  receiving, from the plurality of microphones that are arranged to capture ambient sound from within an ambient environment in which the media source device is located, microphone signals that include a second input audio signal played back by the speaker, wherein the second input audio signal comprises the first input audio signal that has been digitally signal processed by the media playback device;
  producing an echo reference microphone signal that represents an echo path between the media source device and the media playback device based on the microphone signals and the first input audio signal, wherein the echo reference microphone signal includes at least a portion of the second input audio signal; and
  producing an echo cancelled output audio signal by performing echo cancellation upon each of the microphone signals using the first input audio signal and the echo reference microphone signal as reference signals.

2. The method of claim 1 further comprising:
  performing, upon each microphone signal, echo cancellation using the first input audio signal to determine an estimate of echo in the microphone signal; and
  producing an indicator of echo activity from one or more determined estimates, wherein the echo reference microphone signal is produced from the microphone signals and using the indicator of echo activity.

3. The method of claim 2, wherein the indicator of echo activity comprises an average of all of the determined estimates.

4. The method of claim 1, wherein the second input audio signal comprises the first input audio signal that is digital signal processed by the media playback device performing at least one of audio compression, loudness normalization, spectral shaping, downmixing, upmixing, or limiting of the first input audio signal.

5. The method of claim 1, wherein each performance of the echo cancellation produces an echo cancelled signal and an estimate of echo for each microphone signal, wherein producing the echo cancelled output audio signal comprises performing noise suppression upon each echo cancelled signal based on each estimate.

6. The method of claim 1, wherein the first input audio signal comprises:
  a downlink audio signal of a call that is established between the media source device and an electronic device, or
  speech of a virtual personal assistant that was triggered by a user of the media source device.

7. The method of claim 6 further comprising transmitting the echo cancelled output audio signal to the electronic device as an uplink audio signal during the call.

8. The method of claim 1, wherein the media source device is a separate electronic device from the media playback device and the speaker.

9. A media source device comprising:
  a plurality of microphones that are arranged to capture ambient sound from within an ambient environment in which the media source device is located;
  one or more processors; and
  memory having instructions stored therein which when executed by the one or more processors causes the media source device to:
    receive a first input audio signal;
    transmit, over a wireless network, the first input audio signal to a media playback device that is communicatively coupled to a speaker;
    receive, from the plurality of microphones, microphone signals that include a second input audio signal played back by the speaker, wherein the second input audio signal comprises the first input audio signal that has been digitally signal processed by the media playback device;
    produce an echo reference microphone signal that represents an echo path between the media source device and the media playback device based on the microphone signals and the first input audio signal, wherein the echo reference microphone signal includes at least a portion of the second input audio signal; and
    produce an echo cancelled output audio signal by performing echo cancellation upon each of the microphone signals using the first input audio signal and the echo reference microphone signal as reference signals.

10. The media source device of claim 9, wherein the memory has further instructions to:
  perform, upon each microphone signal, echo cancellation using the first input audio signal to determine an estimate of echo in the microphone signal; and
  producing an indicator of echo activity from one or more determined estimates, wherein the echo reference microphone signal is produced from the microphone signals and using the indicator of echo activity.

11. The media source device of claim 10, wherein the indicator of echo activity comprises an average of all the determined estimates.

12. The media source device of claim 10, wherein the memory further comprises instructions to apply a latency upon each of the microphone signals.

13. The media source device of claim 9, wherein each performance of the echo cancellation produces an echo cancelled signal and an estimate of echo for each microphone signal, wherein producing the echo cancelled output audio signal comprises performing noise suppression upon each echo cancelled signal based on each estimate.

14. The media source device of claim 9, wherein the first input audio signal is a downlink audio signal of a call that is established between the media source device and an electronic device.

15. The media source device of claim 14 further comprising transmitting the echo cancelled output audio signal to the electronic device as an uplink audio signal during the call.

16. The media source device of claim 9, wherein the first input audio signal comprises speech of a virtual personal assistant that was triggered by a user of the media source device.

17. A method performed by a programmed processor of a system that includes a media source device that is communicatively coupled to a media playback device, the method comprising:
   receiving an input audio signal that comprises a first sound;
   receiving a microphone signal from at least one microphone of the media source device, wherein the microphone signal comprises a second sound that comprises the first sound of the input audio signal that has been audio processed and played back by the media playback device;
   generating an estimate of echo in the microphone signal by performing echo cancellation upon the microphone signal using the input audio signal; and
   generating an echo reference microphone signal based on the microphone signal and the estimate of the echo.

18. The method of claim 17, wherein the media source device comprises a plurality of microphones, wherein the method further comprises:
   generating, for each microphone signal received from each microphone of the plurality of microphones, a corresponding estimate of the echo by performing the echo cancellation; and
   producing an average estimate from at least some of the generated corresponding estimates, wherein the echo reference microphone signal is generated based on the average estimate.

19. The method of claim 18, wherein the microphone signal further comprises ambient sound captured from within an ambient environment in which the media source device is located, wherein generating the echo reference microphone signal comprises suppressing the ambient sound from the microphone signal according to the average estimate.

20. The method of claim 17, wherein the microphone signal further comprises ambient sound of an ambient environment in which the media source device is located, wherein generating the echo reference microphone signal comprises using the estimate of the echo to suppress the ambient sound within the microphone signal.

* * * * *